UNITED STATES PATENT OFFICE.

CARL BENSINGER, OF MANNHEIM, GERMANY.

PROCESS FOR THE MANUFACTURE OF HOLLOW COMBS.

1,124,691.        Specification of Letters Patent.      Patented Jan. 12, 1915.

No Drawing.      Application filed October 22, 1912. Serial No. 727,139.

*To all whom it may concern:*

Be it known that I, CARL BENSINGER, of Mannheim, a subject of the Grand Duke of Baden, and whose post-office address is Carolastrasse 9, Mannheim, in the Grand Duchy of Baden, German Empire, have invented a new and useful Improved Process for the Manufacture of Hollow Combs; and I do hereby declare that the following is a full, clear, and exact description of my invention, which will enable others skilled in the art to which it appertains to make and use the same.

It is not new to manufacture articles out of celluloid with the assistance of the well known method of pressing or blowing using two sheets or one folded sheet (which represents two sheets) or a flattened tube. Among these articles were combs blown or pressed but only in so far, as the comb had a hollow back and hollow coarse teeth. As soon as the manufacturer tried to make combs with fine teeth, or more difficult yet, with fine and coarse teeth, such as represent the ordinary dressing combs, he found difficulties which have not been overcome as yet. If we use thin celluloid sheets to mold and blow the comb it is possible to form the back and the coarse teeth hollow, but not the thin teeth, because we need a great deal more celluloid-surface for the fine teeth than for the coarse teeth and back and besides that we find it impossible to form each thin and small tooth into a hollow tube. If we use thicker sheets on the contrary we have the disadvantage of a great deal more material than we really need for the coarse teeth and this surplus will have to find some way of escape during the operation of molding. It will naturally travel in the direction of least resistance and this is in this case the back of the comb, where it will deposit itself in folds. These folds will eventually cause the comb to break. Great have been the efforts, to find some solution of these difficulties and many have tried it, among these the English Patent No. 9268 of the 13th April 1911. But its aim is to remodel the comb so, that the difficulties are avoided and therefore it will not be possible to manufacture each and every desired type. This English patent for example does not overcome these difficulties, it simply limits itself to such models, to which the need of material for the coarse and the fine teeth is about the same (see line 20—23 of the specification).

But the aim of my invention is to find a method with which I can manufacture any and all models. Instead of adjusting the thickness of the two sheets of celluloid to the needs of the particular form in question I on the contrary have an average thickness of celluloid sheets to which I fasten in any way so much new additional material, as is needed at just the special place, where it is needed so that I can according to my wish, form any part or spot of my comb just at the necessary place, into a hollow or solid body with the help of the known method of blowing or molding. And here begins my invention.

I take any desired model with coarse and fine teeth or with entirely fine teeth and manufacture a metallic form for molding and blowing purposes in the usual way. Into this form, I place two sheets of celluloid and in that part of each where the fine teeth are to be formed, I insert a small additional piece of celluloid, said additional piece being just sufficient to provide a solid plate into which at a later stage of the process teeth are sawed or cut. The blank is then formed by blowing in the usual way. The amount of material in the plate may be accumulated so as to produce either a hollow back and solid, coarse teeth, or a hollow back and hollow, coarse teeth and a solid plate with the hollow back for the fine teeth which are to be formed thereon later on. This requires a mold showing coarse teeth and a solid plate for the fine teeth. If desired, a mold having both coarse and fine teeth may be used, in which case the product is a comb having both coarse and fine teeth which do not require further cutting or sawing. The amount of the additional material is such that the volume of the total material in that part, namely the two sheets and the additional celluloid, have the same colume as the body to be produced by the blowing and pressing minus the volume of the hollow chambers in the comb.

It is natural that I can mold in this way all the teeth solid if it is desired to do so by sacrificing material, so that I have a comb with a hollow back only and likewise is it possible to mold or blow any desired part of the comb hollow or solid.

Having fully described my invention, what I desire to claim, and secure by Letters Patent of the United States, is:—

1. The process of blowing combs from celluloid which consists in providing two plates of celluloid from which a hollow back and hollow large teeth are to be formed, in adding thereto another plate of celluloid for forming the fine teeth, in placing said plates into a mold, and in introducing a pressure medium between said plates to form the comb within said mold.

2. The process of blowing combs from celluloid which consists in placing into a mold plates of celluloid for forming the hollow back and hollow large teeth, in inserting an additional plate for forming solid fine teeth and in supplying a pressure medium to said mold to form the comb.

In testimony whereof I have hereunto set my hand in presence of two subscribing witnesses.

Dr. CARL BENSINGER.

Witnesses:
N. Plauen,
Dr. Gernandt.